United States Patent [19]

Yu

[11] 4,189,061
[45] Feb. 19, 1980

[54] FIXED BOTTLE COVER DEVICE OF COMPRESSED AIR THERMOS BOTTLE

[76] Inventor: Sheu-Jin Yu, 795, Tong-Ta Rd., HsinChu City, Taiwan

[21] Appl. No.: 964,849

[22] Filed: Nov. 29, 1978

[51] Int. Cl.² ............................................ B65D 45/16
[52] U.S. Cl. .................................................... 220/326
[58] Field of Search ............... 220/324, 326, 334, 342, 220/343

[56] References Cited

U.S. PATENT DOCUMENTS 2,015,999  10/1935  Frank ................................... 220/326
2,594,467  4/1952   Lynch, Jr. et al. ............... 220/326 X Primary Examiner—George T. Hall
Attorney, Agent, or Firm—Karl W. Flocks

[57] ABSTRACT

A fixed bottle cover device of compressed air thermos bottle comprised a bottle cover having a stationary shaft, on its side edge, which is attached to a holding fixture generally provided in the upper side of the conventional thermos bottle body. The holding fixture includes an external clamp plate and an internal seat plate and between the said two members a coil compressed spring is equipped for controlling the disclosure and closure of the holding fixture so as to be arbitrarily united or severed the bottle cover and the thermos bottle body.

3 Claims, 4 Drawing Figures

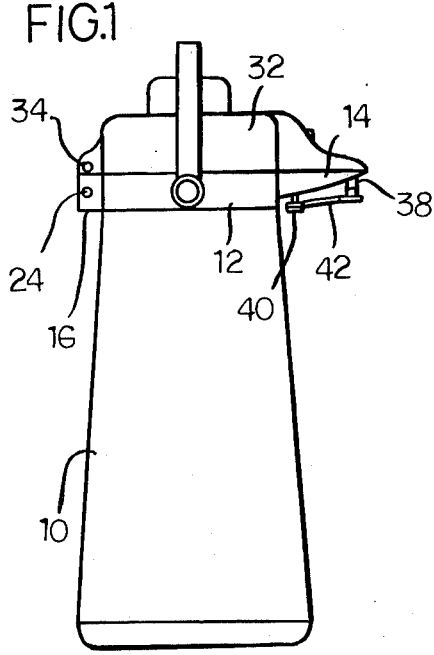
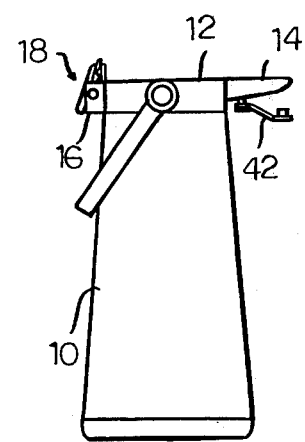
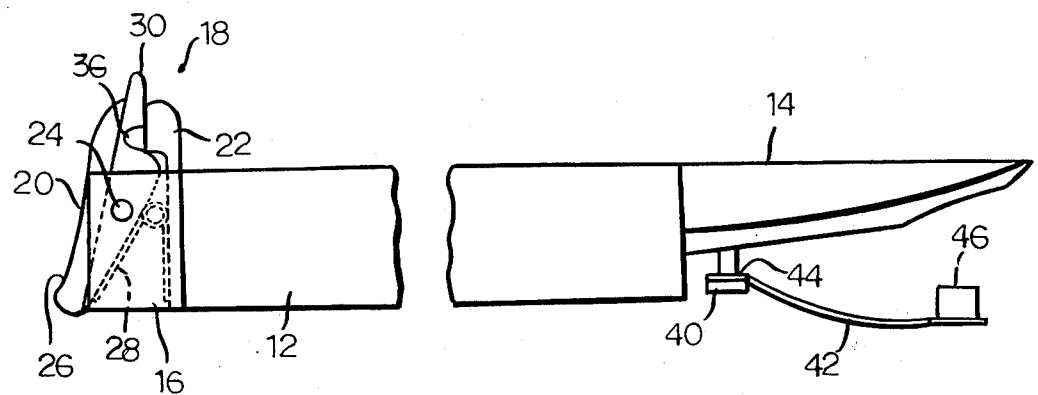
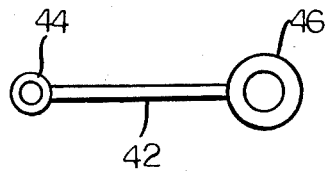

FIXED BOTTLE COVER DEVICE OF COMPRESSED AIR THERMOS BOTTLE

BACKGROUND OF THE INVENTION

The present invention relates to a fixed bottle cover device of compressed air thermos bottle and, more particularly, to a fixed bottle cover, which is fixed on a thermos bottle body, capable of being lifted up and closed down and arbitrarily removed from the thermos bottle body.

According to the fixed bottle cover device of compressed air thermos bottle of the present invention, there is a compressed pump which is equipped within the interior of the bottle cover. On the other hand, within the thermos bottle body, there is a suction pipe extending outward to outside so as to exhaust water or liquid from the thermos bottle body through the suction pipe by means of compressing the pump of the bottle cover to compress air into the thermos bottle body.

At present, however, the bottle cover of the conventional compressed air thermos bottle is fixed on the thermos bottle body, but can not be easily removed from the thermos bottle body depending on the users' requirements. Therefore, it is rather inconvenient to users during filling water or washing and cleansing. Also in the conventional compressed air thermos bottle, the pump is usually easy to be out of order and always needs to be repaired. Due to thermos bottle cover being fixed on the thermos bottle body and incapable of being removed, repairs are very inconvenient.

Furthermore, the nozzle of the suction pipe in the conventional thermos bottle extends outward through the bottle, but it lacks the installation of a bottle plug. Therefore, when users are careless to touch the switch device of the pump or when the thermos bottle, which is completely full of liquid, is covered by its cover together with compressing pressure into the bottle, the liquid within the bottle will spill over through the nozzle to scald human body and dirty materials, dust and poisonous air, which are contained in the air, will also easily permeate into the thermos bottle through the nozzle. In addition, the conventional thermos bottle will lose heat more easily so that it is not easy to preserve heat of the thermos bottle.

The primary object of the present invention is to provide a fixed bottle cover device having novel and simple construction and being surely achieved by certain improvements.

SUMMARY OF THE INVENTION

In accordance with the present invention, the thermos bottle body is set a top collar on its upper end. One end of the top collar is to be provided with an extention portion, the other end is provided with a fixed seat having a holding fixture of bottle cover. The holding fixture includes an external clamp plate which is fixed in the fixed seat by a axle pin and an internal seat and a coil compressed spring equipped between the pressed location provided in the bottom end of the external clamp plate and the internal seat plate so that the close location provided in the upper end of the external clamp plate will closely tighten with the upper end of the internal seat plate while the bottom end of the external clamp plate being forced by pressure of the coil compressed spring; and hence the stationary shaft of the bottle cover may be closely attached to the notch of the external clamp plate. Further, it may depend on the users' requirements to press the said pressed location of the external clamp plate, the external clamp plate will be, by the axle pin as a supporting point, against pressure of the coil compressed spring to make its upper end, the closed location, seperate from engaged position with the internal seat plate so that the bottle cover can be easily removed from the thermos bottle body.

The other object of the present invention is to provide a fixed bottle cover device of compressed air thermos bottle, wherein the nozzle of the suction pipe which extends outward is equipped with a bottle plug so arranged as to block the said nozzle to prevent heat of liquid within the bottle body from loss, or dirty materials from permeating, or water from spilling over.

DESCRIPTION OF THE DRAWINGS

FIG. 1 is a front view of the present invention in which the bottle cover has been set on the thermos bottle body.

FIG. 2 is a front view of the present invention in which the bottle cover has been removed from the thermos bottle body.

FIG. 3 is an enlarged partial front view of the fixed bottle cover device of the present invention.

FIG. 4 is a top view of the bottle plug in accordance with the present invention.

DETAILED DESCRIPTION

Referring to FIGS. 1 and 2, a fixed bottle cover device of compressed air thermos bottle is comprised of a top collar 12 which is set on the upper end of the bottle body 10. One end of the top collar 12 is to be provided with an extension portion 14 for a suction pipe extending out, the other end is provided with a fixed seat 16 having a holding fixture 18 of bottle cover.

Referring to FIG. 3, the holding fixture 18 of bottle cover includes an external clamp plate 20 which is fixed in the fixed seat 16 by an axle pin 24 and an internal seat plate 22 and a coil compressed spring 28 equipped between the pressed location 26 provided in the bottom end of the external clamp plate 20 and the internal seat plate 22 so that the closed location 30 provided in the upper end of the external clamp plate 20 will closely tighten with the upper end of the internal seat plate 22 while the bottom end of the external clamp plate 20 being forced by pressure of the coil compressed spring 28; and hence the stationary shaft 34 of the bottle cover 32 may be closely attached to the notch 36 of the external clamp plate 20. The notch 36 is slightly larger than the diameter of the stationary shaft 34 so that the stationary shaft 34 can rotate within the notch 36 and the bottle cover 32 can be arbitrarily lifted up and closed down.

When it is desired to remove the bottle cover 32, the user should only press the pressed location 26 of the external clamp plate 20, the external clamp plate 20 will be, by the axle pin 24 as a supporting point, against pressure of the coil compressed spring 28 to make its upper end, the closed location 30, seperate from engaged position with the internal seat plate 22 so that the bottle cover 32 can be easily removed from the thermos bottle body.

In addition to the aforesaid construction of the extension portion, a fixed base 40 of bottle plug is set on a suitable place near the nozzle 38 of the suction pipe. One end of the bottle plug is a fixed collar 44 connected with the fixed base 40 of bottle plug, the other end is a stopper 46 which is exactly to block the nozzle 38 of the suction pipe to prevent liquid within the thermos bottle from spilling over, to prevent heat from loss and dust from permeating.

I claim:

1. A fixed cover device for compressed air thermos bottle comprising a holding fixture for said cover, a bottle body, a top collar set on the upper end of the bottle body, one end of the top collar being provided with an extension portion, the other end of said top collar being provided with a fixed seat including said holding fixture for said bottle cover, said holding fixture including an external notched clamp plate cooperating with a shaft fixed to said cover fixed in said fixed seat by an axle pin, an internal seat plate, a compressed coil spring in the bottom end of said external clamp plate and said internal seat plate whereby in the closed position the upper end of the external clamp plate will tightly close on the upper end of the internal seat plate while the bottom end of the external clamp plate is forced by pressure of the compressed coil spring, and whereby said shaft fixed to said bottle cover may be intimately associated with said external notched plate.

2. A fixed bottle cover device as claimed in claim 1, wherein the holding fixture may be controlled by pressing the external clamp plate, whereby the external plate supported by the axle pin against the pressure of the compressed coil spring in the closed position may be separated from its engaged position with the internal seat plate and then the bottle cover may be easily removed from the thermos bottle body.

3. A fixed bottle cover device as claimed in claim 1, wherein the notch of said external notched clamp plate is slightly larger than the diameter of said fixed shaft so that said fixed shaft can rotate within said notch.

* * * * *